INVENTOR.
KAM LI
BY John V. Regan
ATTORNEY

INVENTOR.
KAM LI
BY John V. Regan
ATTORNEY

INVENTOR.
KAM LI
BY John V. Regan
ATTORNEY

DATA SCRIPT CONVERSION SYSTEM

Filed Oct. 26, 1959 5 Sheets-Sheet 4

INVENTOR.
KAM LI
BY John V. Regan
ATTORNEY

Nov. 24, 1964 KAM LI 3,158,841

DATA SCRIPT CONVERSION SYSTEM

Filed Oct. 26, 1959 5 Sheets-Sheet 5

INVENTOR.
KAM LI
BY John V. Regan
ATTORNEY 3,158,841
Patented Nov. 24, 1964

3,158,841

DATA SCRIPT CONVERSION SYSTEM

Kam Li, Levittown, Pa., assignor to Radio Corporation of America, a corporation of Delaware Filed Oct. 26, 1959, Ser. No. 848,732
12 Claims. (Cl. 340—173)

The present invention relates to electronic data handling systems, and more particularly to systems capable of operating with information signals represented either in phase form or in amplitude form.

In certain data handling systems the two binary digits "1" and "0" are represented respectively by two mutually opposite phases of a continuous signal. For example, in system using parametric oscillator circuits, a continuous signal in either one or the other of the two phases may be used to represent the one and the other binary digit. This type of notation may be referred to as phase script. In certain other data handling systems, information is represented by two D.C. (direct current) levels. The two binary digits may be represented, for example, by a signal of either a high or a low D.C. level in a given time interval. This type of notation may be referred to as amplitude script.

Each of these types of notation has certain advantages. On the one hand, circuits for operating with amplitude script notation can be readily designed using simple semiconductor elements, such as negative resistance diodes. On the other hand, phase script circuits are less sensitive to timing problems since the phase of the oscillator signal is readily locked to the phase of an information signal without involving critical timing problems. In certain applications it is desirable to use both types of information notation in one system.

It is an object of the present invention to provide novel and improved systems utilizing both phase script and amplitude script information signals.

Another object of the present invention is to provide novel and improved systems utilizing both negative resistance diode circuits and parametric oscillator circuits.

Still another object of the present invention is to provide improved data handling systems of the type referred to above which are capble of operating at relatively high speed.

In accordance with one feature of the present invention, a negative resistance diode having two stable operating states is set to a desired one of these states depending upon the phase of an applied information signal. The information signal may be provided by a parametric oscillator circuit. According to another feature of the invention, a parametric oscillator is set to a desired one of its operating phases depending upon the D.C. operating level of a negative resistance diode. A further feature of the invention is a novel memory arrangement using negative resistance elements as the storage devices and parametric oscillator circuits as the selection means.

Figure 1:
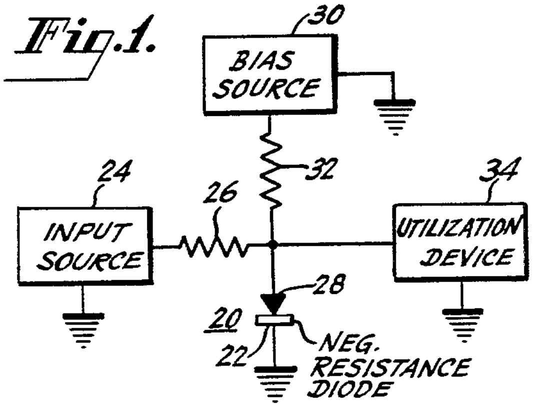
FIGURE 1 is a schematic diagram of a negative resistance diode circuit which is useful in explaining the operation of the present invention.

FIGURE 1 illustrates a bistable circuit having a negative resistance diode 20 as the active circuit element. The cathode 22 of the diode 20 is connected to circuit ground and input signals from an input source 24 are applied through an input resistor 26 to the anode 28. The input resistor 26 serves to insure that the input source 24 provides current pulses. In certain arrangements, as when a plurality of diodes are used, the input resistors also serve as decoupling elements. To provide these functions the input resistor is made ten or more times larger than the average value of the diode resistance in the positive operating regions. The diode operating point is determined by a D.C. bias source 30 connected through a load resistor 32 to the anode 28. An output signal is obtained across the load resistor 32 and applied to a utilization device 34 which is also connected to the anode 28 of the diode.

Figure 2:
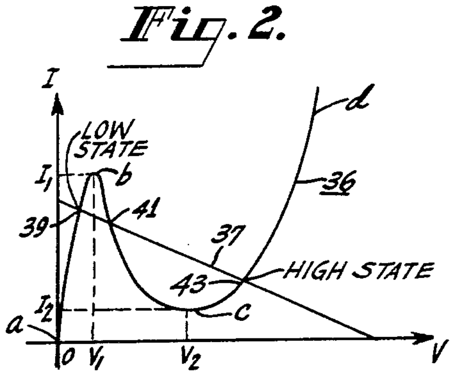
FIGURE 2 is a graph of the current vs. voltage characteristic of a negative resistance diode suitable for use in the circuit of FIG. 1.

The curve 36 of FIG. 2 represents a plot of the current flowing through the negative resistance diode 20 as a function of the applied voltage across the diode. The curve 36 has a negative resistance region between the points *b* and *c* and two positive resistance regions between the points *a*, *b* and *c*, *d*, respectively. In the region $V_1$ to $V_2$ of the curve energizing voltages increasing in amplitude above the critical value $V_1$ causes a corresponding decrease in diode current flow from a relatively high value $I_1$ towards a relatively low value $I_2$ due to the negative resistance of the diode. Further increase of the energizing voltage above the value $V_2$ causes further increase of the diode current in conventional manner. The point *b* at the maximum of curve 36 represents a so-called "break" point. The negative resistance diode may be of the type described by H. S. Sommers, Jr. in an article published in the July 1959 issue of the Proceedings of the IRE, p. 120.

To achieve bistable operation with the circuit of FIGURE 1, a load line 37, which is determined by the size of the load resistor 32, and the internal impedance of the bias source 30 is drawn on the graph of FIGURE 2 and intersects the curve 36. By properly selecting the load resistor 32, the load line intersects the curve 36 in three points 39, 41, and 43. The points 39 and 43 are intersection points with the curve 36 in positive resistance regions and are therefore points of stable operation. That is, the circuit of FIGURE 1 can be maintained quiescently in either of these two operating points. The circuit is therefore bistable. The intersection point 41 is in the negative resistance region and thus the point 41 represents an unstable operating condition. When the circuit is in the state represented by the operating point 39, the voltage across the diode 20 is relatively low and this point may also be defined as the low state, or the "zero" state. When the circuit is in the state represented by the operating point 43, the voltage across the diode 20 is relatively high, and this point may be defined as the high state or the "one" state.

The operating point may be switched from the high state to the low state or vice versa by applying a switching or triggering signal of proper polarity to the diode. For example, if the diode 20 is in the low state and a positive pulse of suitable large amplitude is applied to the anode 28, from the input pulse source 24, the load line 37 is shifted in the upward direction beyond the point $b$. The diode operating point then rapidly shifts to the portion of the curve $c$, $d$, and at the termination of the pulse stabilizes at the point 43. In a similar manner, if the circuit is in the high state and a negative pulse of suitably large amplitude is applied to the cathode 28 of the diode from the input pulse source 24, the load line is then shifted downward, beyond the point $c$ and the operating point thereupon rapidly shifts from the point 43 to stabilize at the pulse termination at the point 39.

As described hereinafter, the signals for shifting the operating state of the diode 20 may be a pair of properly phased sinusoidal signals applied to the diode 20. One of the sinusoidal signals is generated by a parametric oscillator circuit.

Figures 3, 4:
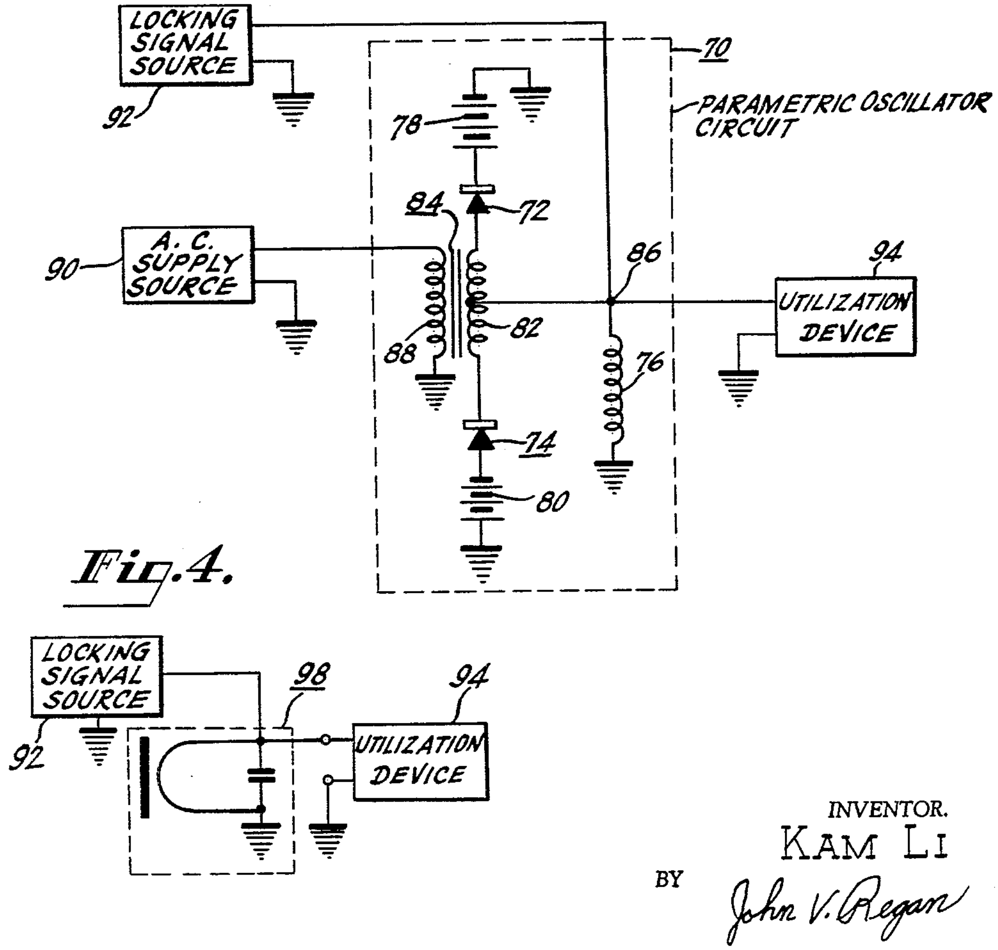
FIGURE 3 is a schematic diagram of one embodiment of a parametric oscillator circuit which may be used in systems according to the present invention.
FIGURE 4 is a diagram including a graphical symbol representative of a parametric oscillator of the type shown in FIG. 3.

One type of parametric oscillator circuit 70 is shown in FIG. 3. The circuit 70 is connected in a balanced arrangement including, for example, a pair of variable capacity diodes 72 and 74 and a linear inductance element 76. The diodes 72 and 74 are biased in the reverse direction by a pair of batteries 78 and 80. A.C. (alternating current) supply signals are applied to the diodes 72 and 74 via a secondary winding 82 of a linear supply transformer 84. The secondary winding 82 has a center tap connected to one terminal of the inductance element 76 at a junction point 86. The other terminal of the inductance element 76 is connected to circuit ground. The primary winding 88 of the supply transformer 84 is connected to the output of an A.C. supply source 90. A locking signal source 92 has an output connected to the junction point 86. A utilization device 94 has an input connected to the junction point 86. The supply source 90, the signal source 92, and the utilization device 94 are each provided with a ground connection. Each of the batteries 78 and 80 also has a ground connection. Other arrangements of parametric oscillator circuits may be used, if desired. An article by E. I. Goto entitled "Parametric Excitation and Its Application to a Non-Linear Pendulum" published in the "Journal of the Institute of Electrical Communication Engineers of Japan," volume 38, describes a parametric oscillator circuit using a pair of nonlinear magnetic elements and a linear capacitor arranged in a parametric oscillator circuit.

FIGURE 4 is a schematic diagram of a convenient and simplified symbol used hereinafter to represent a parametric oscillator of the type shown in detail in FIGURE 3. The circuit 98 represents the parametric oscillator. In this representation, input signals are applied to the parametric oscillator circuit 98 by the locking signal source 92, and output signals are applied to the utilization device 94, which is connected with the parametric oscillator 98. The A.C. supply source and the locking signal source are not specifically shown in this simplified figure.

Figure 5:
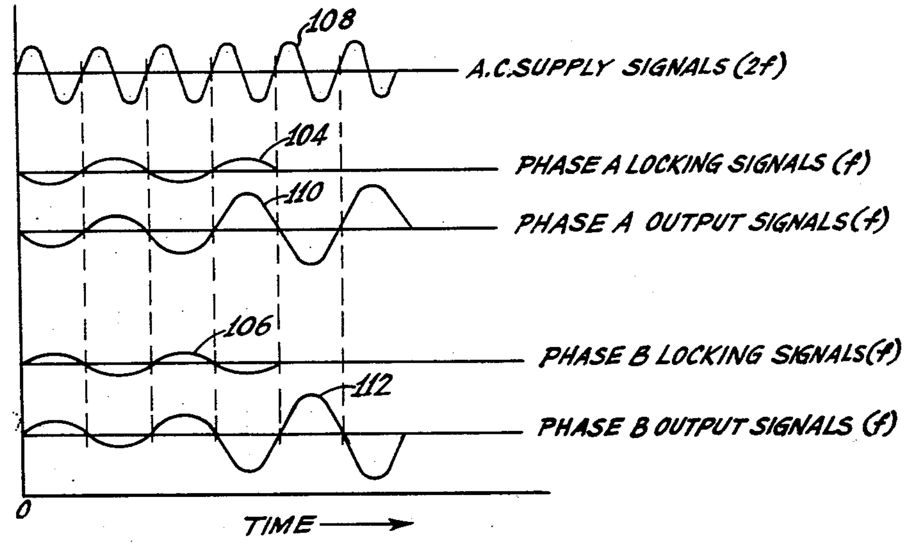
FIGURE 5 is a graph of waveforms, all in the same time scale, which illustrate the operation of the parametric oscillator circuit of FIG. 3.

The waveforms of FIGURE 5 illustrate the operation of the phase-locked oscillator circuit of FIGURE 3. The curve 108 represents the A.C. supply signals of frequency $2f$ from A.C. source 90 and the curves 104 and 106 represent the input or locking signals of frequency $f$ from the locking signal source 92. The output signals, also at frequency $f$, are shown by the curves 110 and 112. The locking signals are applied in either one or the other of the two phases designated phase A or phase B and represented, by the curves 104 and 106 respectively. The phase A and phase B locking signals are 180° out of phase with each other. One of these locking signals is applied to the parametric oscillator at a time just prior to the application of the A.C. supply signals 108. In the absence of A.C. supply signals, relatively little or no output is produced by the circuit. When the A.C. supply signals are first applied, the oscillations begin to build-up exponentially in the same phase as the previously applied control signals. After the output oscillations have reached a certain amplitude, the locking signals 104 and 106 may be removed and the circuit continues to oscillate in the set phase.

When it is desired to change the phase of oscillations of the parametric oscillator, one technique which may be used is to remove the A.C. supply signals, apply a new locking signal in the desired phase, and finally again apply the A.C. supply signals. The circuit then oscillates in the new phase.

Figures 6, 11:
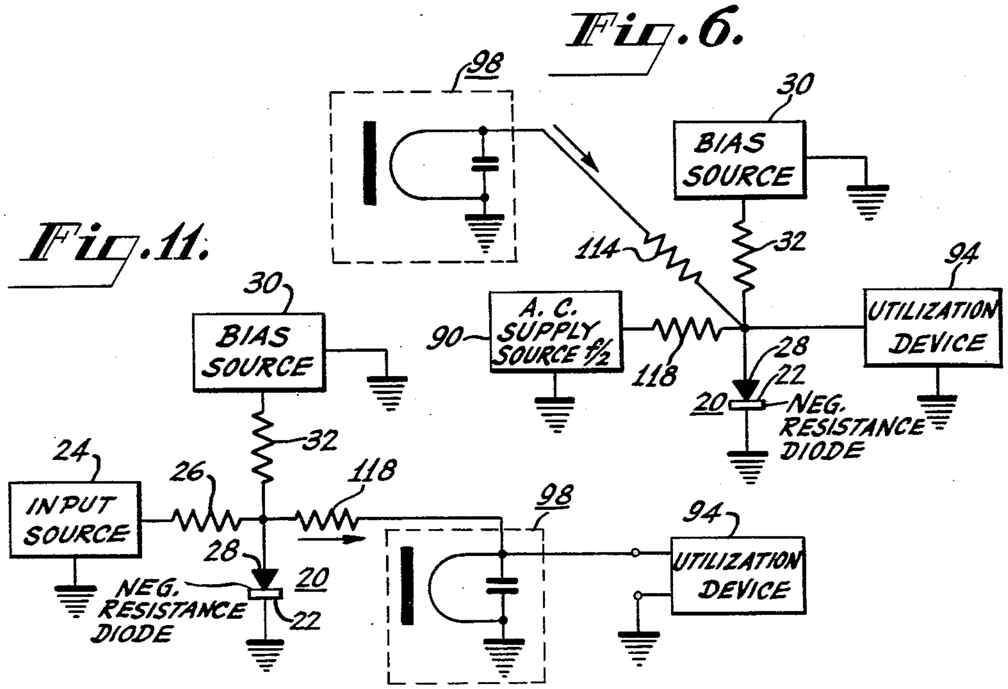
FIGURE 6 is a schematic circuit diagram of a system in accordance with the present invention in which a parametric oscillator circuit controls the state of a negative resistance diode circuit.
FIGURES 9 and 11 are schematic circuit diagrams of systems in accordance with the present invention in which a negative resistance diode circuit controls the phase of a parametric oscillator circuit.
Figure 7:
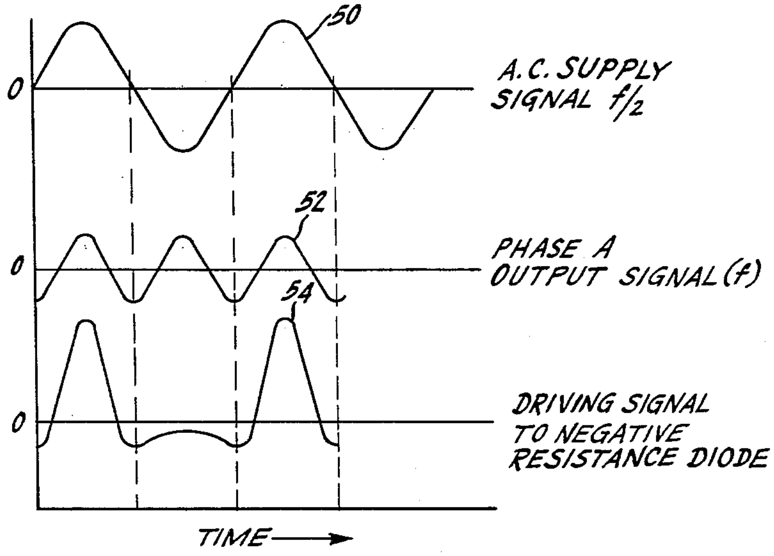
FIGURES 7 and 8 are graphs of waveforms, all in the same time scale, which illustrate the operation of the circuit of FIG. 6.
Figure 8:
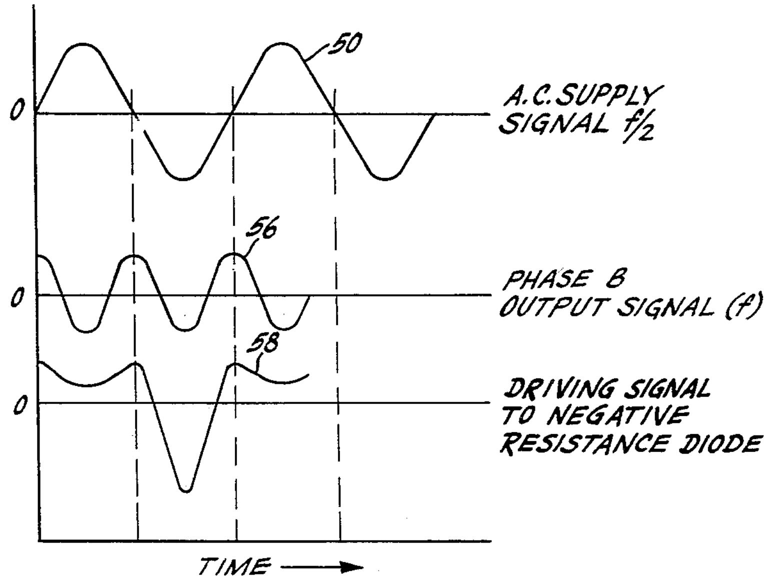

In FIGURE 6, the parametric oscillator circuit of FIGURE 4 is utilized to switch the operating state of the negative resistance diode circuit of FIG. 1. The negative resistance diode 20 cathode electrode 22 is connected to circuit ground. A D.C. bias source 30 is connected to the anode electrode 28 through a load resistor 32. An output signal from the parametric oscillator 98 at a frequency $f$ and of either phase A or phase B is applied to the anode 28 of the diode 20 through an input resistor 114. A sinusoidal energizing signal at frequency $f/2$ is also applied to the anode 28 by an A.C. supply source 90 which is connected with the anode 28 by a resistor 118. The amplitude of the supply signal is made larger than (say twice) that of the oscillator signal. The source 90 signal together with the oscillator 98 output signal operate to switch the diode 20 to either the "high" or "low" state (FIG. 2) depending upon the phase of the oscillator signal. A D.C. level output signal is derived across the negative resistance diode 20 and is applied to the utilization device 94 which is connected with the anode 28, as explained more fully in connection with FIGS. 7 and 8. FIGURES 7 and 8 illustrate graphically how the addition of the supply and oscillator signals produce net switching signals of either positive or negative polarity. In FIGURE 7 an A.C. supply signal 50 of frequency $f/2$ is shown in the top line; an oscillator output signal 52 of frequency $f$ and in phase A is shown in the middle line. Preferably the phases of the supply and oscillator signals are adjusted so that the cross-over points of the supply signal occur at the maximums of the oscillator signal. A relatively high amplitude positive pulse signal is obtained, during each positive phase of the supply signal as illustrated by the waveform 54 of the bottom line. The resultant signal 54 then operates to drive the negative resistance diode 20 to its "high" state. The relatively small amplitude negative portions of the resultant signal 54 are of insufficient amplitude to change the diode from the "high" to the low state. Accordingly after termination of the applied signals, the diode remains in the "high" state. If desired, the oscillator signals 52 may be applied continuously to the diode as they are of insufficient amplitude to change the diode to the "low" state in the absence of the supply signals.

As illustrated in FIGURE 8, the A.C. supply signal 50 at a frequency $f/2$ is added to the oscillator phase B output signal 56 of frequency $f$. When the supply and phase B oscillator signals are combined, a relatively high amplitude negative pulse is obtained during each negative phase of the supply signal, as shown by the waveform 58. The resultant signal 58 operates to drive the negative resistance diode from the "high" to the "low" voltage state. The positive polarity portion of the resultant waveform 58 are of insufficient amplitude to change the diode from the "low" to the "high" state. Upon termination of the supply signals, the diode remains in the "low" state.

It has thus been shown that a parametric oscillator circuit may be used to control the operating state of a circuit utilizing a negative resistance diode. The converse type of operation may also be achieved wherein a bistable circuit utilizing a negative resistance diode supplies the proper signals to switch the phase of a parametric oscillator circuit.

Figure 9:
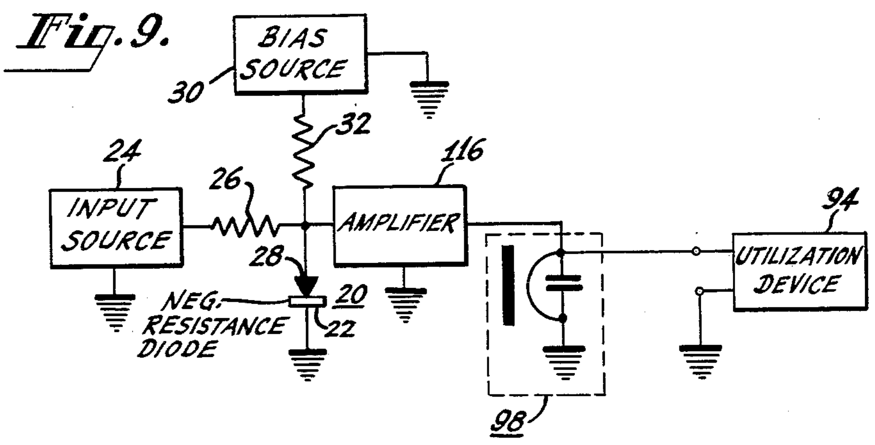

FIGURE 9 shows one circuit for achieving the latter type of operation. In this circuit, the negative resistance diode 20 is forward biased by a D.C. bias source 30 which is connected to the diode anode electrode 28 through a load resistor 32. The cathode 22 is connected to circuit ground. A.C. input signals are applied from an input source 24 through an input resistor 26 to the diode anode 28. An A.C. output signal is obtained from the anode 28 and is applied to an amplifier 116. An A.C. output signal from the amplifier 116 is then applied as a locking signal to the parametric oscillator 98 to control the operating phase thereof. An output signal from the parametric oscillator 98 then may be applied to a utilization device 94 connected therewith.

Figure 10:
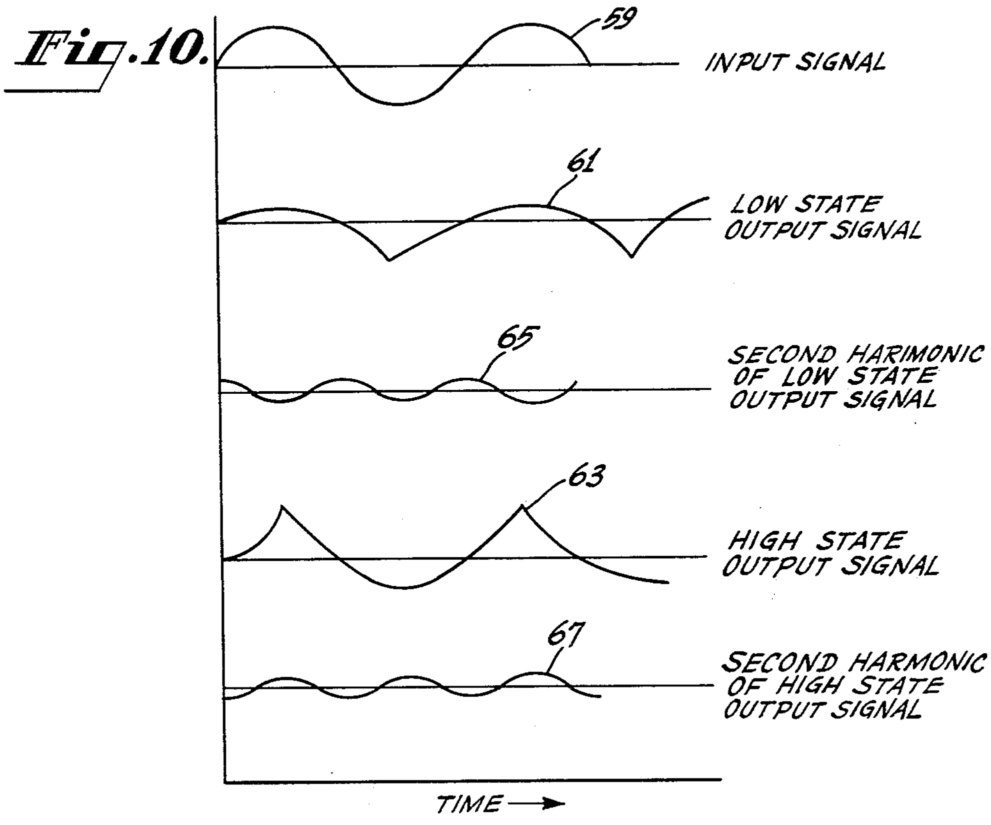
FIGURE 10 is a graph of waveforms, all in the same time scale, which illustrates the operation of the circuits of FIGS. 9 and 11.

The operation of the circuit of FIG. 9 may be better understood by referring to the waveforms of FIGURE 10. The waveforms of FIGURE 10 illustrate the output signal from the negative resistance diode 20 when an A.C. input signal is applied thereto from the input source 24. When the negative resistance diode circuit is arranged for bistable operation, its operation may be understood from the volt-ampere characteristic of FIGURE 2, as was explained heretofore. This volt-ampere characteristic is non-linear in the operating region about the "low" state and "high" state operating points. Therefore, if an A.C. input signal, such as shown by the sinusoidal waveform 59, is applied to the negative resistance diode 20 when the diode is in the "low" state, a distorted output signal such as shown by the waveform 61 is obtained. In a similar manner, if the sinusoidal input signal is applied to the negative resistance diode 20 when the diode circuit is operating in the "high" state, a distorted output signal such as shown by the waveform 63 is obtained.

The volt-ampere characteristic curve 36 has an opposite type of curvature for operation about the "low" and "high" state operating points, which explains why the output signals are also distorted in an opposite manner. That is, the low state output signal waveform 61 is concave in the downward direction, while the high state output signal waveform 63 is concave in the upward direction. A Fourier analysis of the signal waveforms 61 and 63 indicates that their second harmonics are 180° out of phase with each other, as shown by the waveforms 65 and 67 respectively. The second harmonics of the high and low state output signal are then effective as locking signals for controlling the phase of the parametric oscillator. In this manner, a negative resistance diode circuit can supply a locking signal to a parametric oscillator, and this locking signal switches the phase of the parametric oscillator to either phase A or phase B depending upon whether the diode was in the "high" state or in the "low" state.

Thus, in operation of the circuit in FIGURE 9, the input signal source applies a limited amplitude sinusoidal supply signal to the negative resistance diode 20. The amplitude of the supply input signal is regulated to a value less than that required to swing the operating point (from the point 43 of FIG. 2) into the negative resistance region (beyond the point $c$). Any suitable circuit (not shown) can be used to set the diode 20 to either the "high" state or the "low" state. If the diode 20 is in the high state, an output signal such as shown by the waveform 63 (FIG. 10) is applied to the amplifier 116. The amplified output signal is then applied as a locking signal to the parametric oscillator 98. The second harmonic of the amplified output signal, illustrated by the waveform 67, is then effective in controlling the phase of the parametric oscillator. When the negative resistance diode circuit is in the "low" state, an output signal is obtained therefrom such as shown by the waveform 61. This signal is also applied to the amplifier 116 and the amplified output signal therefrom is then applied as a locking signal to the parametric oscillator 98. The second harmonic of the low state output signal is shown by the waveform 65 of FIGURE 10, and is effective in controlling the phase of the parametric oscillator 98.

The amplifier 116 increases the amplitude of the locking signal from the negative resistance diode 20 before it is applied to the parametric oscillator 98. The amplifier 116 also provides isolation. The amplifier 116 may be eliminated if a sufficiently large output signal is obtained from the negative resistance diode 20. Accordingly, the amplifier might be replaced by a simple resistor coupling element as shown in FIGURE 11. In this circuit, the resistor 118 replaces the isolation function of the amplifier 116. In all other respects, the circuits of FIGS. 9 and 11 are identical.

Figure 12:
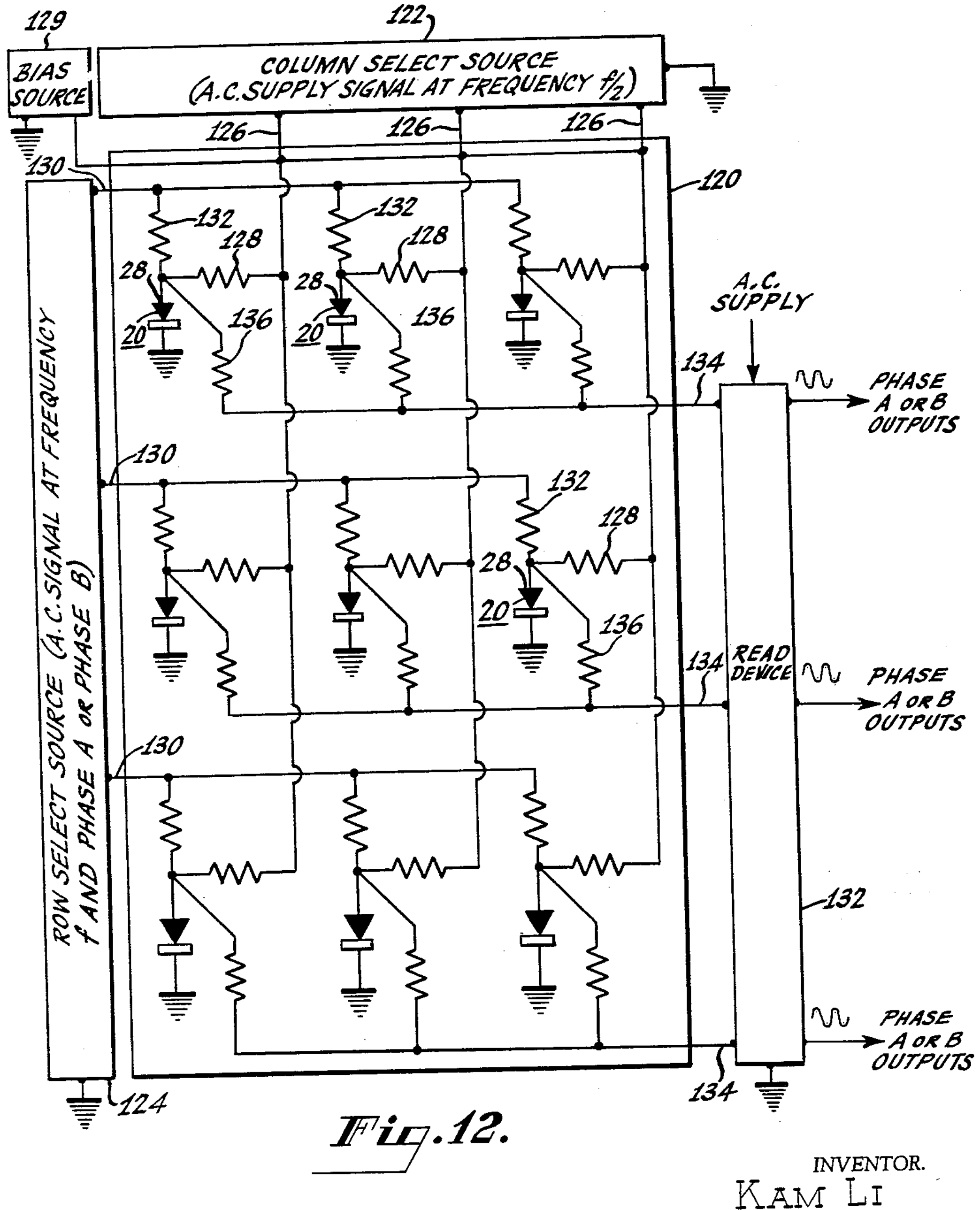
FIGURE 12 is a schematic diagram of a system in accordance with the present invention and useful as a memory device.

A memory system may be provided utilizing the techniques discussed heretofore, and such a system is shown in FIGURE 12. In this system, negative resistance diodes are utilized in the memory elements and parametric oscillators are utilized in the row select source and the read device. A plurality of negative resistance diodes 20 are biased to provide bistable operation and thus provide memory action. A plurality of these negative resistance bistable circuits are arranged in a two-dimensional storage array as indicated in the exemplary array 120. The array 120 has, for example, a 3×3 array of negative resistance diode bistable circuits, each similar to that of FIGURE 7 wherein the column select source applies an A.C. supply signal of frequency $f/2$ to the diode stages. The row select source 124 either phase A or phase B signals to the diode stages. The read source comprises a plurality of parametric oscillators each being connected to one row of diodes in the memory.

The column select source 122 and the row select source are used to write a binary digit "1" or "0" into a desired one of the negative resistance diodes 20 in coincident current fashion. The three outputs of the column select source 122 are connected respectively to the three column lines 126 of the array 120. Each of negative resistance diodes 20 of any one column is coupled by a separate input resistor 128 to the corresponding one column select line 126. The column select source applies an A.C. supply signal of frequency $f/2$ to the column select lines 126.

A common bias source 129 is connected to each of the column lines 126 and applies the proper D.C. bias voltage to obtain bistable operation of each negative resistance diode 20. The three outputs of the row select source 124 are connected respectively to the three row select lines 130 of the array 120. Each of the negative resistance diodes 20 of any one row is coupled by a separate input resistor 132 to the corresponding one row select line 130. The row select source 124 comprises, for example, a plurality of parametric oscillators of the type described heretofore (FIGS. 3 and 4), each connected to one of the row select lines 130. A read device is used to determine the operating state of the negative resistance diodes. The three outputs of the read device 132 are connected respectively to three read lines 134 of the array 120. The anode 28 of each negative resistance diode 20 of a column are coupled to a different one of the read lines 134 by separate isolating resistors 136.

Binary information is written into a desired negative resistance diode 20 by concurrently applying a signal to one of the column lines 126 and one of the row lines 130 which connect with the desired diode. The column select source 122 applies an A.C. supply signal at a frequency $f/2$ to the one column line 126 of the desired diode 20. The row select source concurrently applies an output signal from a parametric oscillator at a frequency $f$ and in phase A or phase B to the one row line 130 of the desired diode 20. The resultant signals applied to the desired diode 20 are as illustrated in FIGS. 7 and 8. The final state of the thus selected negative resistance diode 20 depends on the phase of the signal from the row select source 124. These combined signals at the negative resistance diode cause the diode to switch to either the "high" state or the "low" state as desired, thereby storing one or the other of the two binary digits.

The stored information is non-destructively read out from all the diodes of any desired column of the memory in "word organized" fashion. That is, the separate digits stored in the separate memory locations along a column are read out at the same time. During the read operation, the column select source 122 is operated to apply a sinusoidal A.C. signal to the desired one column lines 126. An individual readout signal is then obtained on each readout line 134. Each of the readout signals on any one readout line 134 is either in the phase A or phase B depending on the state of the diode 20 coupled to that one readout line. Each readout signal is applied as a locking signal to one of the plurality of parametric oscillators connected to each of the read lines 134. After the readout signal is applied to the desired column line 126, the A.C. supply for the read parametric oscillators of the read device 132 is turned on. The readout signals thus control the phases of the respectively coupled parametric oscillators in the read device 132 and a burst of output signals in either the phase A or B at the corresponding output of the read device 132. After termination of the read operation the column signals and A.C. supply signals are removed and the read device 132 oscillators return to their initial non-oscillating condition. The information stored in the memory is not affected by the interrogation signal.

What is claimed:

1. In a circuit, the combination comprising a negative resistance diode having two stable operating states, means for applying a first A.C. signal of one frequency to said diode, and means for applying a second A.C. signal of one-half said one frequency to said diode, said first A.C. signal having either of two opposite phases, said diode being switched to the one or the other of said two states in accordance with the phase of said first signal.

2. In a circuit, the combination comprising a negative resistance diode having two stable operating states, means for applying a first signal of frequency $f/2$ to said diode, a parametric oscillator circuit oscillating at a frequency $f$ and in either of two opposite phases, means for deriving an output signal from said parametric oscillator and means for applying said output signal to said diode to control the operating state thereof.

3. In a circuit, the combination comprising a negative resistance diode, a load impedance element connected to said diode, terminal means for applying forward bias to said diode whereby said diode has two stable operating states, means for applying to said diode a first A.C. signal of one frequency, and means for applying to said diode a second A.C. signal of one-half said one frequency, said first A.C. signal having either of two opposite phases whereby said diode is switched between its two operating states.

4. In a circuit, the combination comprising a parametric oscillator circuit oscillating at a given frequency in either one or the other of two opposite phases, a negative resistance diode having two stable operating states, means for applying an A.C. signal to said negative resistance diode, and means for deriving an output signal from said diode and for applying said output signal to said parametric oscillator to switch the oscillating phase thereof.

5. In a circuit, the combination comprising, a negative resistance diode, a load impedance element connected with said diode, means for applying a bias voltage to said diode, said bias voltage forward biasing said diode, means for applying an A.C. signal of a frequency $f/2$ to said diode, a parametric oscillator, said parametric oscillator oscillating at a frequency $f$ and in either one of two opposite phases, means for applying an output signal from said parametric oscillator to said diode to switch the operating state thereof, and means for deriving an output signal from said diode.

6. In a circuit, the combination comprising, a parametric oscillator circuit oscillating at one frequency in either one or the other of two opposite phases, a negative resistance diode, said diode operating in either one or the other of two stable states, means for switching said diode between said two stable states, means for applying an A.C. signal to said diode, and means for obtaining an output signal from said diode and for applying said output signal to said parametric oscillator to control the phase of oscillation thereof.

7. In a circuit the combination comprising, a negative resistance diode, a load impedance element connected with said diode, means for applying operating bias to said diode whereby said diode has two stable operating states, means for triggering said diode between its stable operating states, means for applying an A.C. input signal to said diode, means for deriving an A.C. output signal from said diode, a parametric oscillator oscillating in one or the other of two opposite phases, means for periodically interrupting the oscillations of said parametric oscillator, and means for applying said A.C. output signal from said diode to said parametric oscillator to control the phase of oscillation thereof.

8. A memory system comprising a plurality of memory elements arranged in a matrix having rows and columns, each of said elements comprising a negative resistance diode, means for connecting a bias source to each of said diodes, a plurality of column lines and row lines coupled to each of said rows and columns, means for applying an A.C. signal of frequency $f$ to each of said column lines, means for applying an A.C. signal of a frequency $f/2$ and in either of two opposite phases to said row lines, and a parametric oscillator connected with each row of negative resistance diodes for determining the operating state of said diodes.

9. In combination, a negative resistance diode having two stable operating states, a parametric oscillator capable of operating with signals either one of two phases, said diode being coupled to said oscillator, and means for applying A.C. signals across said diode.

10. The combination as recited in claim 9, said A.C. signals having a frequency one-half the operating frequency of said oscillator.

11. The combination as recited in claim 9, said A.C. signals and said oscillator signals jointly controlling the state of said diode.

12. The combination as recited in claim 9, said A.C. signals having a frequency of one-half the oscillating frequency of said oscillator, said diode producing signals at twice the frequency of said A.C. signals and in one or the other of said two phases corresponding to the two states of said diode, said last mentioned signals operating to control the phase of said oscillator.

References Cited in the file of this patent

UNITED STATES PATENTS

| | | |
|---|---|---|
| 2,815,488 | Von Neuman | Dec. 3, 1957 |
| 2,946,045 | Goto | July 19, 1960 |
| 2,957,087 | Goto | Oct. 18, 1960 |
| 2,958,074 | Kilburn | Oct. 25, 1960 |
| 2,975,377 | Price | Mar. 14, 1961 |
| 2,998,531 | Kiyasu et al. | Aug. 29, 1961 |
| 3,056,039 | Onyshkevych et al. | Sept. 25, 1962 |

OTHER REFERENCES

Publication I, "Elementary Principle of Parametron" by Saburo Muroga, Research and Engineering, September-October 1958, pp. 31-34.